No. 619,692. Patented Feb. 14, 1899.
J. C. PERRY.
WIRE FENCE MAKING MACHINE.
(Application filed May 10, 1897.)
(No Model.) 10 Sheets—Sheet 1.

Witnesses
A. D. Harrison
P. W. Pezzetti

Inventor
John C. Perry.

No. 619,692. Patented Feb. 14, 1899.
J. C. PERRY.
WIRE FENCE MAKING MACHINE.
(Application filed May 10, 1897.)

(No Model.) 10 Sheets—Sheet 2.

Witnesses
A. D. Harrison
P. W. Pezzetti

Inventor
John C. Perry

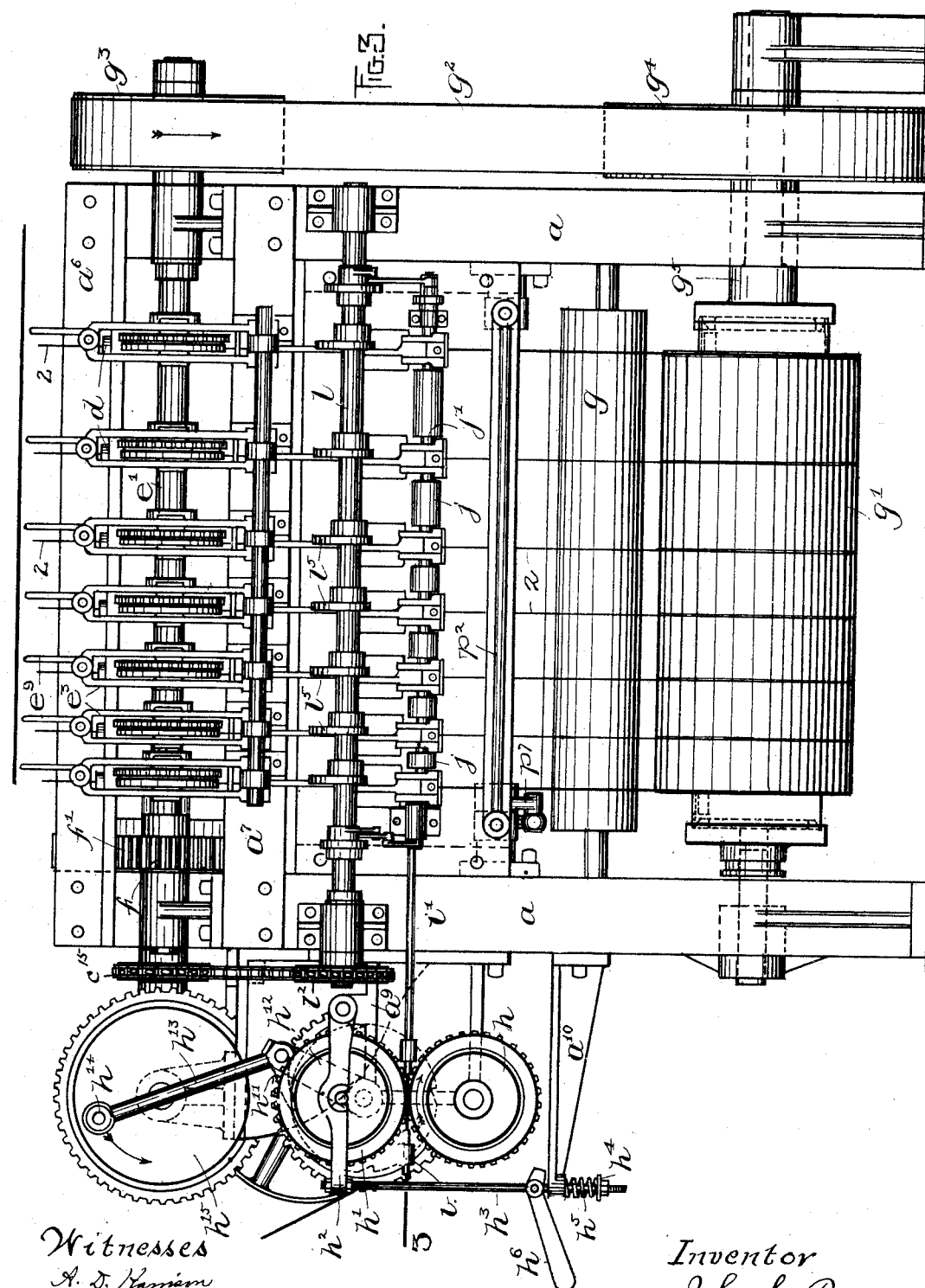

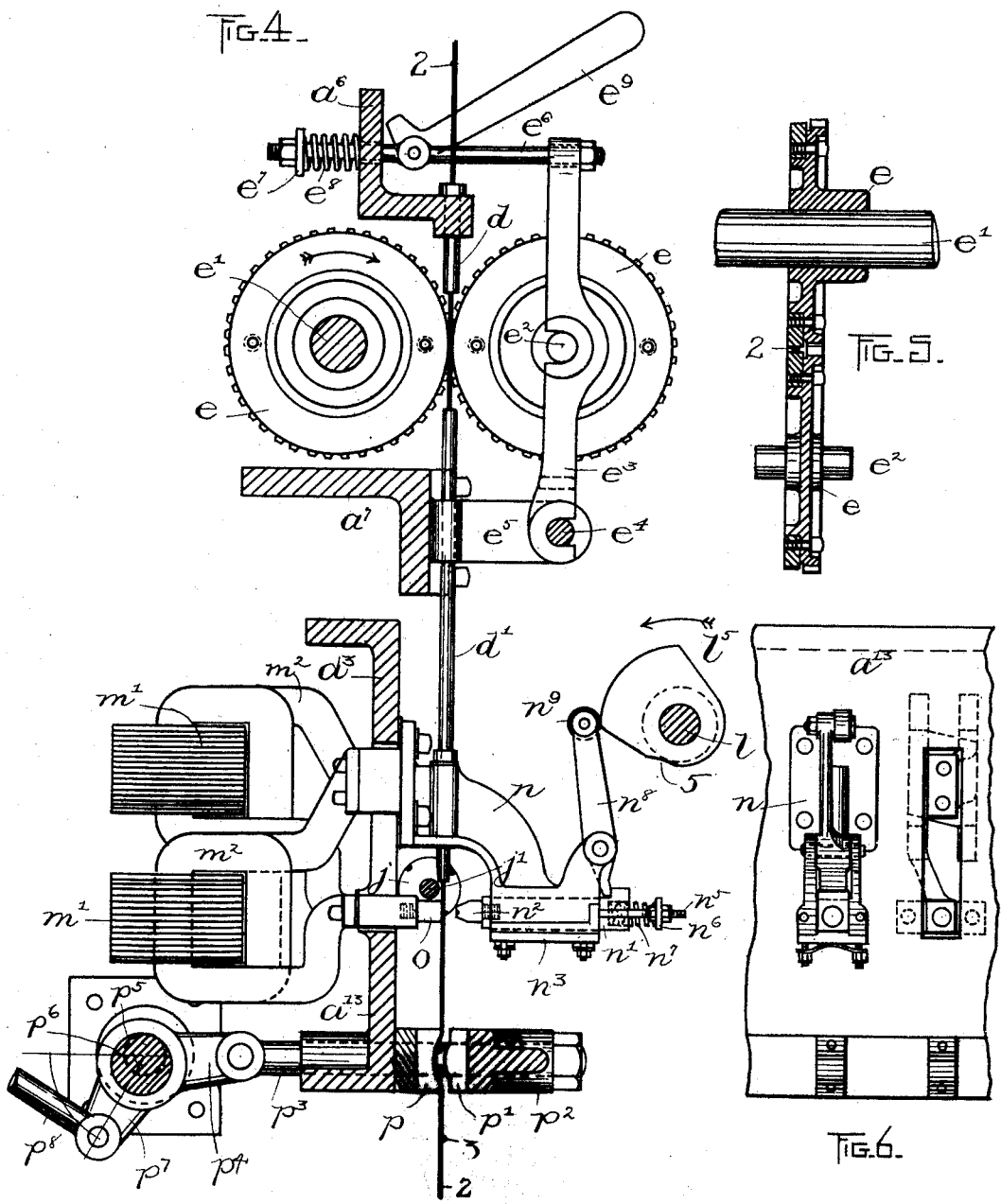

No. 619,692. Patented Feb. 14, 1899.
J. C. PERRY.
WIRE FENCE MAKING MACHINE.
(Application filed May 10, 1897.)
(No Model.) 10 Sheets—Sheet 5.
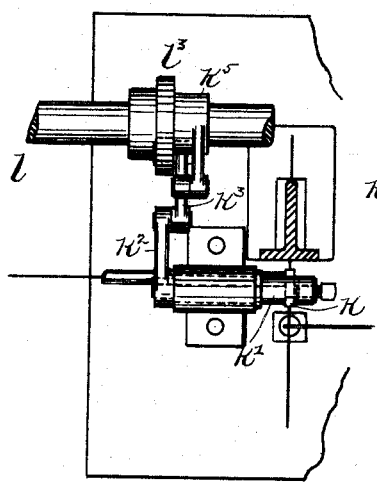
Fig. 9.
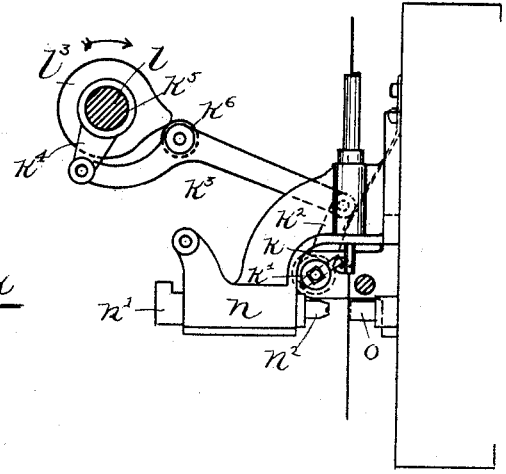
Fig. 10.
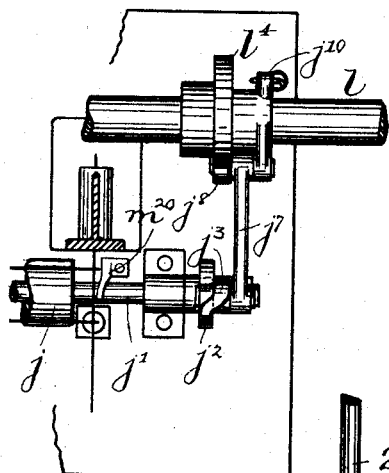
Fig. 7.
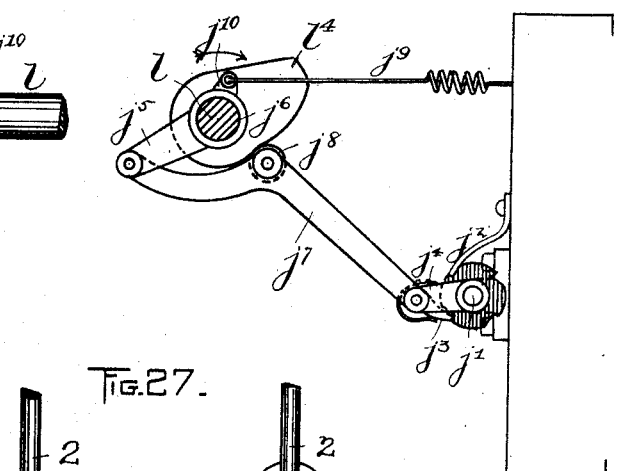
Fig. 8.
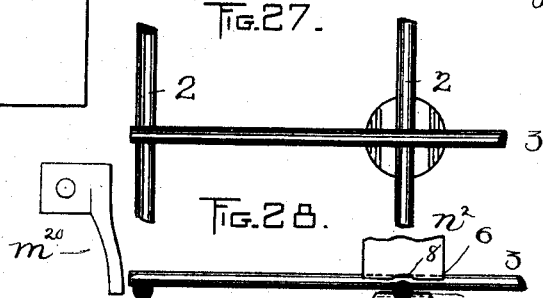
Fig. 27.
Fig. 28.
Witnesses
A. D. Harrison
P. W. Pezzetti
Inventor
John C. Perry No. 619,692. Patented Feb. 14, 1899.
J. C. PERRY.
WIRE FENCE MAKING MACHINE.
(Application filed May 10, 1897.)
(No Model.) 10 Sheets—Sheet 6.
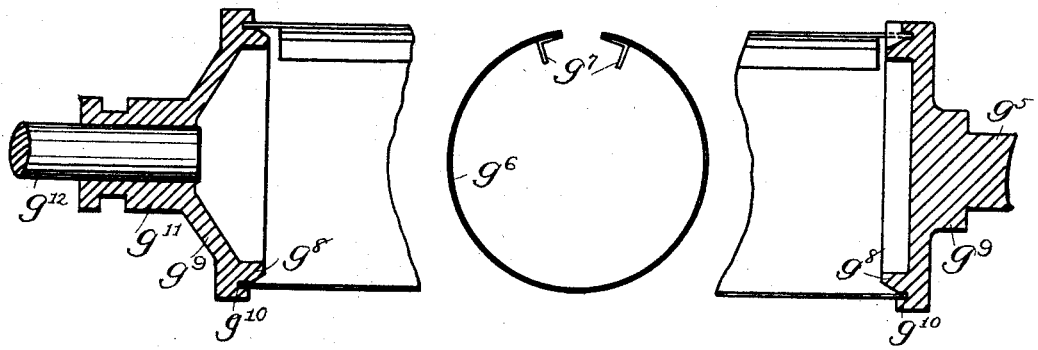
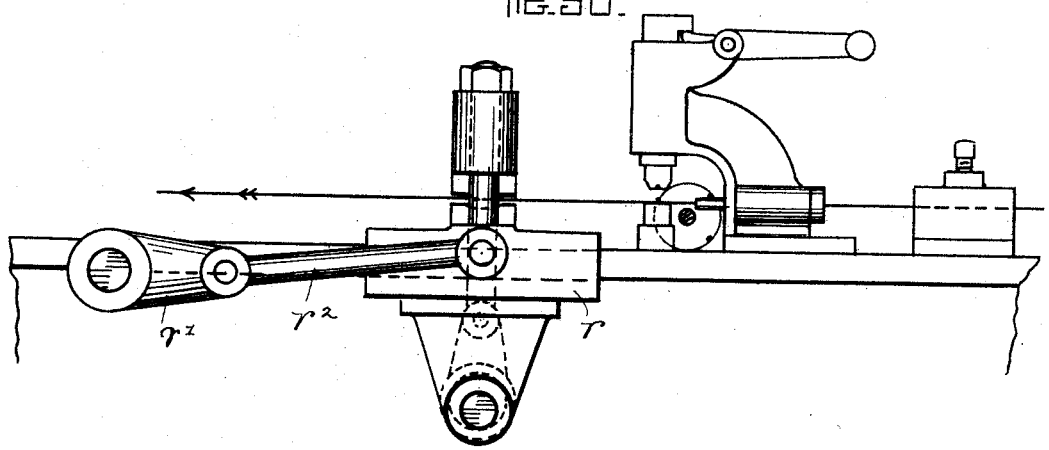
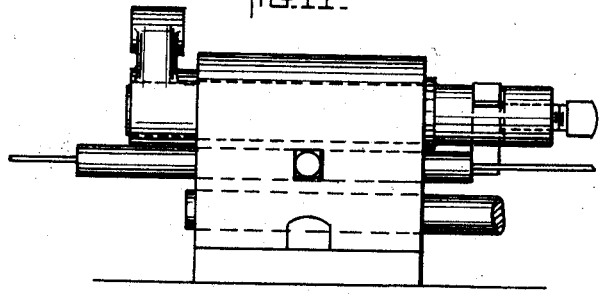
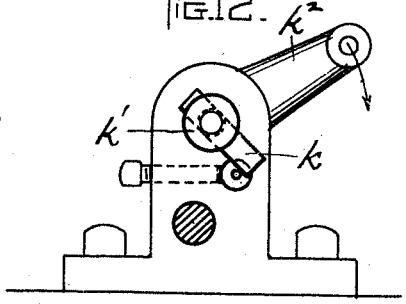
Witnesses
Inventor
John C. Perry.

No. 619,692. Patented Feb. 14, 1899.
J. C. PERRY.
WIRE FENCE MAKING MACHINE.
(Application filed May 10, 1897.)
(No Model.) 10 Sheets—Sheet 7.
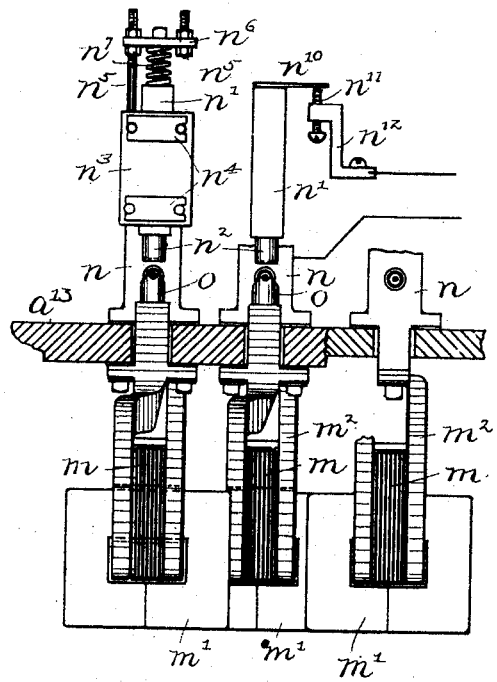
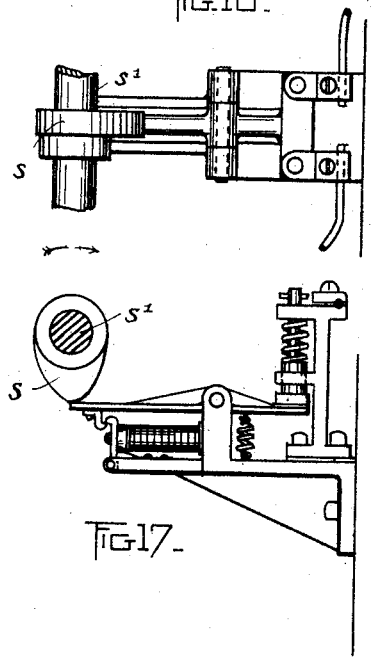
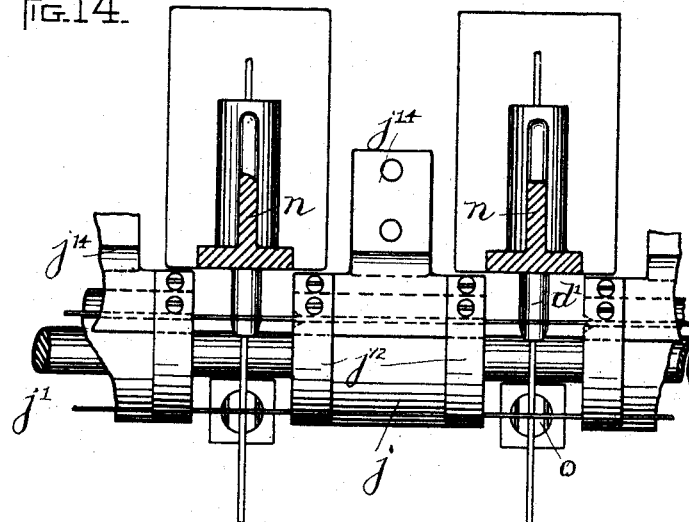
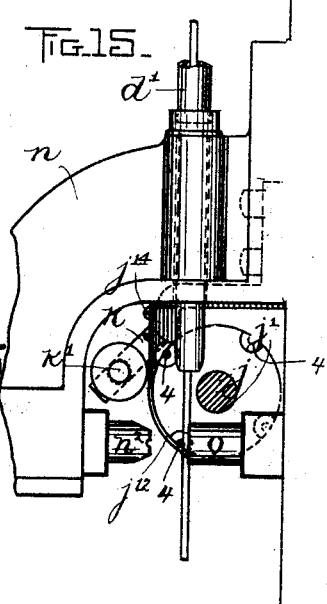
Witnesses
A. D. Harrison
P. W. Pezzetti
Inventor
John C. Perry No. 619,692. Patented Feb. 14, 1899.
J. C. PERRY.
WIRE FENCE MAKING MACHINE.
(Application filed May 10, 1897.)

(No Model.) 10 Sheets—Sheet 8.

Witnesses.
A. D. Hamam.
P. W. Pezzetti.

Inventor
John C. Perry.

No. 619,692. Patented Feb. 14, 1899.
J. C. PERRY.
WIRE FENCE MAKING MACHINE.
(Application filed May 10, 1897.)
(No Model.) 10 Sheets—Sheet 9.
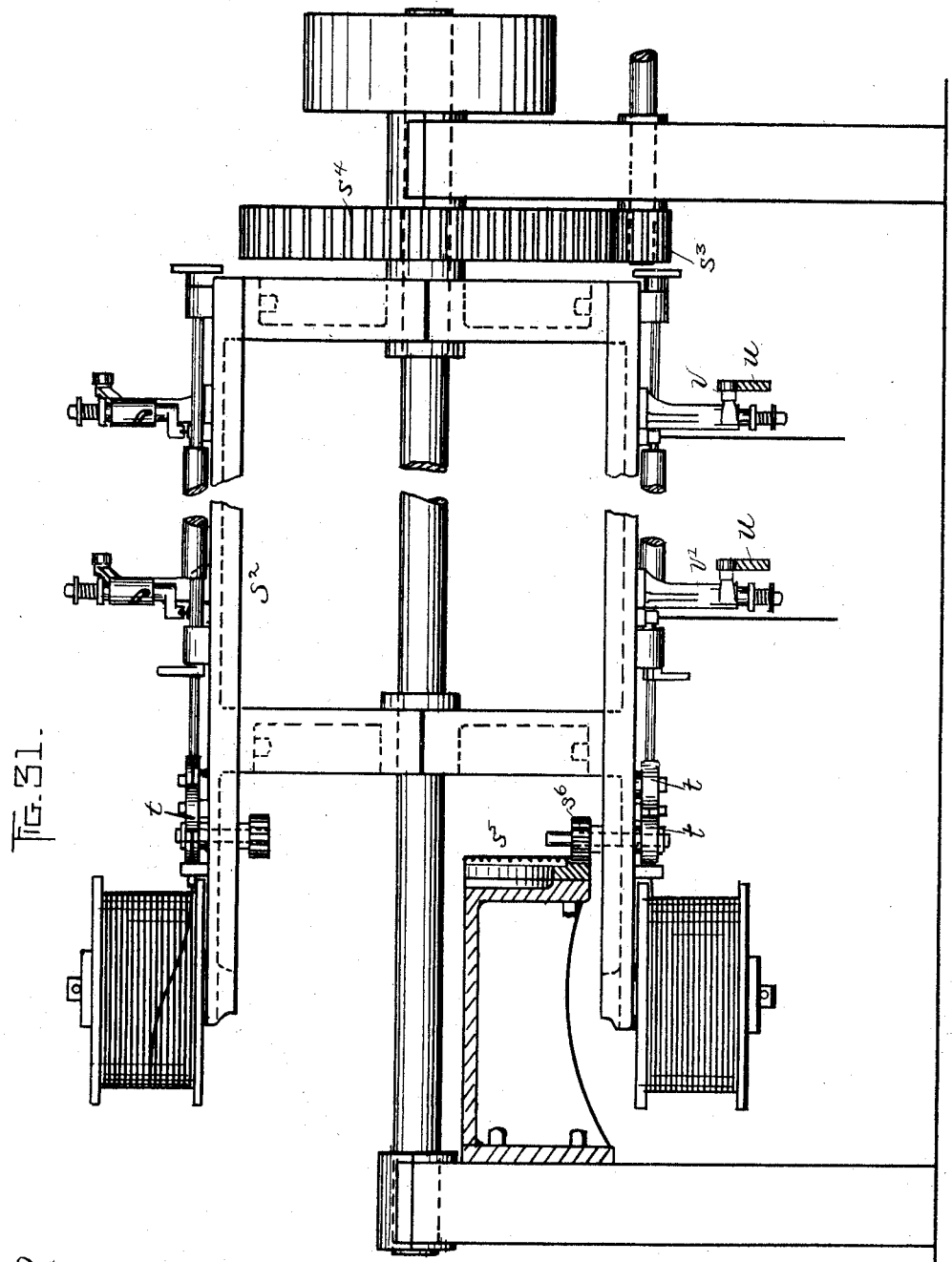
Witnesses
Inventor
John C. Perry.

No. 619,692. Patented Feb. 14, 1899.
J. C. PERRY.
WIRE FENCE MAKING MACHINE.
(Application filed May 10, 1897.)
(No Model.) 10 Sheets—Sheet 10.
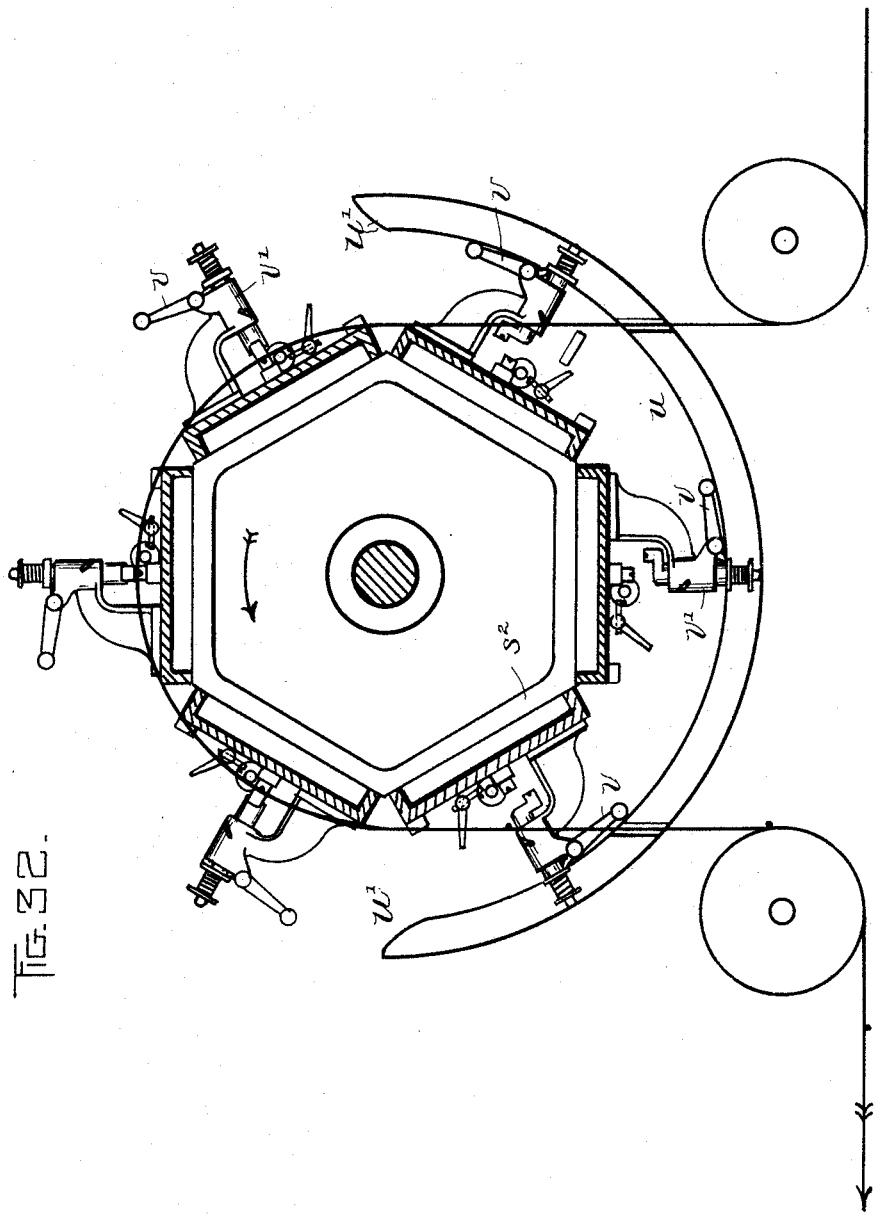
Witnesses
A. D. Hanson.
P. W. Pezzetti.
Inventor
John C. Perry.

UNITED STATES PATENT OFFICE.

JOHN C. PERRY, OF LYNN, MASSACHUSETTS.

WIRE-FENCE-MAKING MACHINE.

SPECIFICATION forming part of Letters Patent No. 619,692, dated February 14, 1899.

Application filed May 10, 1897. Serial No. 635,918. (No model.)

*To all whom it may concern:*

Be it known that I, JOHN C. PERRY, of Lynn, in the county of Essex and State of Massachusetts, have invented certain new and useful Improvements in Machines for Making Wire Fence, of which the following is a specification.

Figure 1:
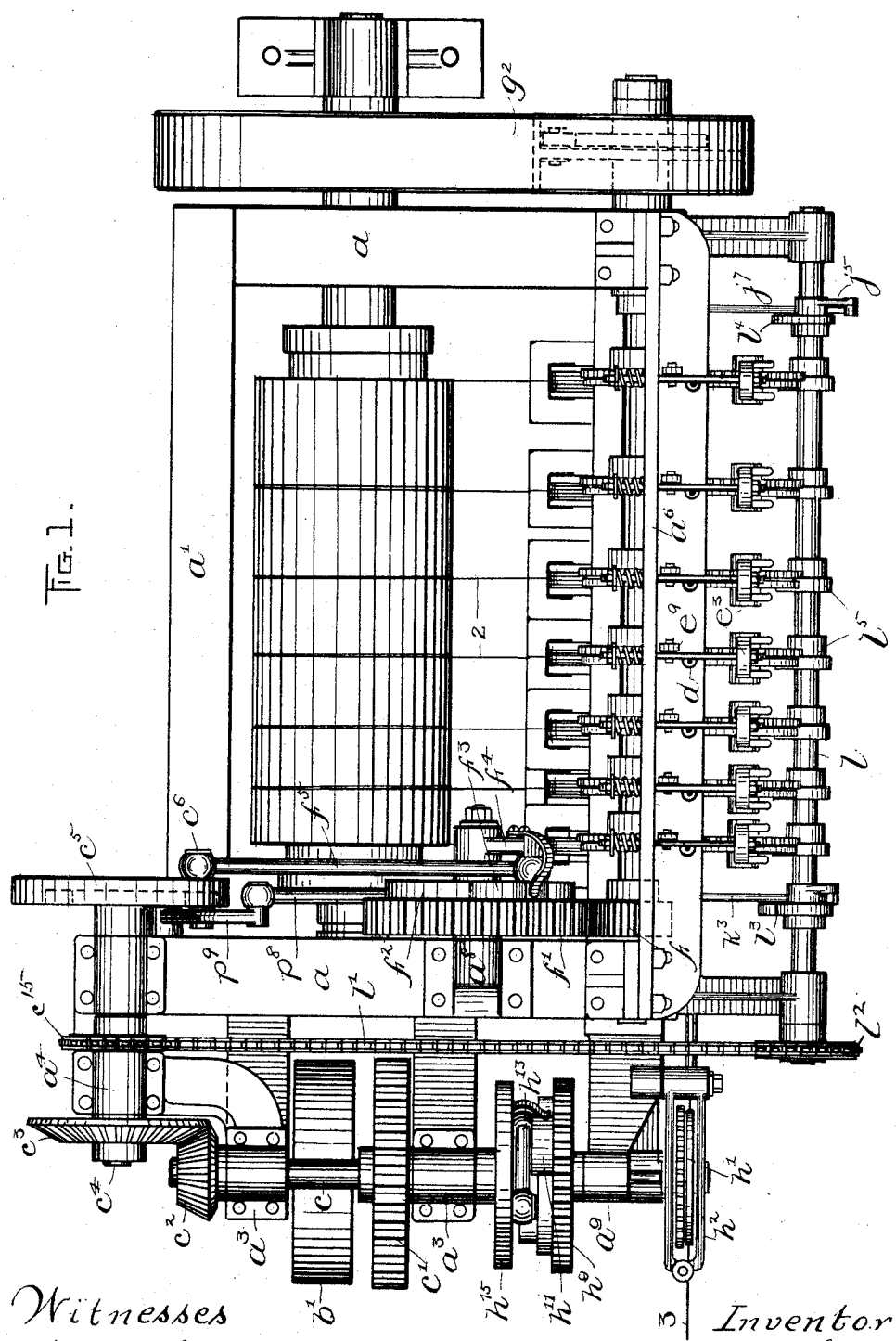
Figure 2:
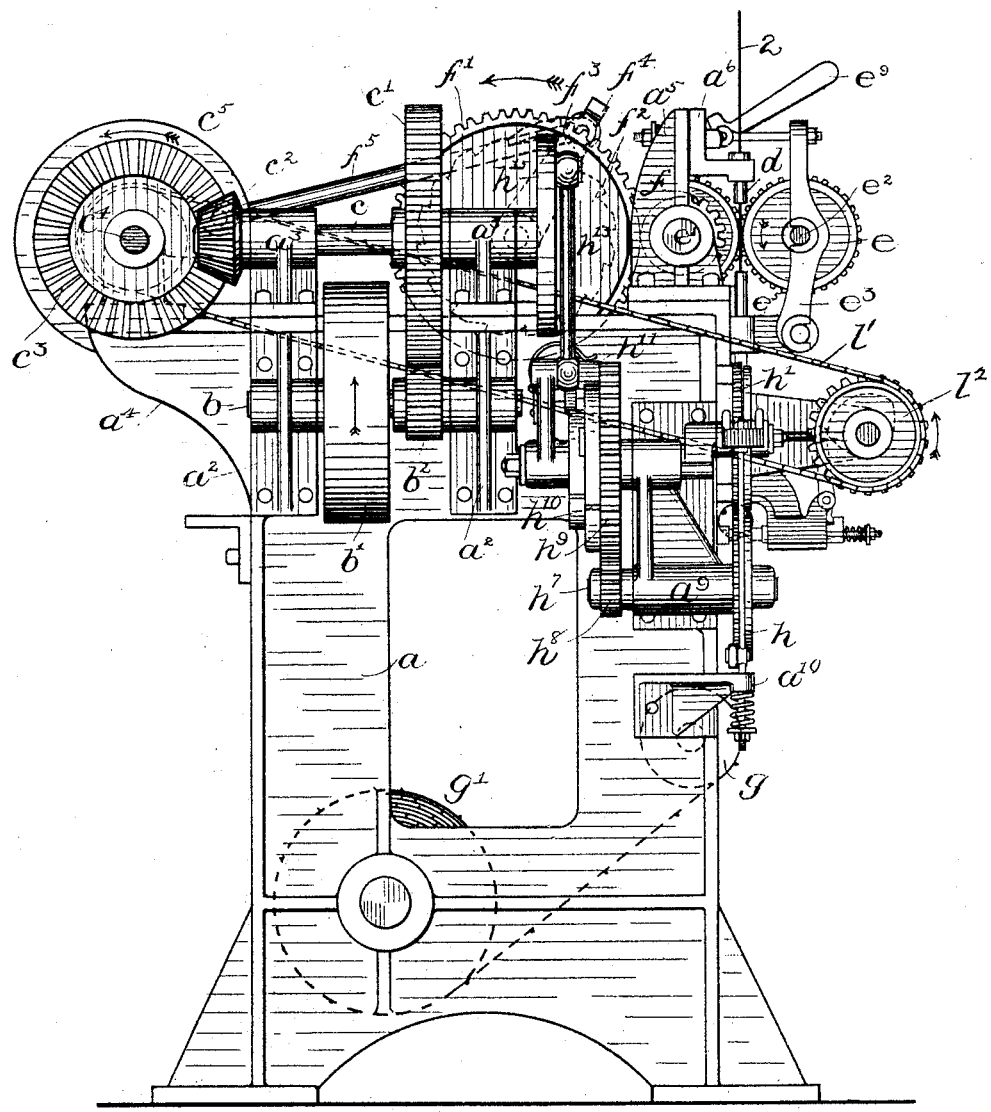

Of the drawings, Figure 1 represents in plan view a machine embodying my invention. Fig. 2 represents a side elevation of the same. Fig. 3 represents a front elevation of the machine. Fig. 4 represents in detail a feeding device for the strand-wires and the electric-welding devices for welding the stay-wires to the strand-wires, the device for crimping the strand-wires being also shown. Fig. 5 represents in horizontal section the feeding-wheels for one of the strand-wires. Fig. 6 represents the welding device in front elevation. Figs. 7 and 8 illustrate means for rotating the holder for the stay-wires before the process of welding. Figs. 9, 10, 11, and 12 illustrate the cutter for the stay-wire. Figs. 13, 14, and 15 are additional views illustrating the electric-welding device. Figs. 16 and 17 illustrate a circuit-breaker for the primary current. Figs. 18, 19, 20, 21, and 22 illustrate devices for regulating the length of the stay-wires or the distance they are fed across the strand-wires. Figs. 23, 24, 25, and 26 illustrate some of the various forms of fence which may be made by my machine. Figs. 27 and 28 illustrate the strand and stay wires in the act of being welded. Fig. 29 illustrates one form of take-up roll for the completed fence. Fig. 30 illustrates another form of machine in which the crimping devices are also employed for feeding the strand-wires forward. Figs. 31 and 32 illustrate another embodiment of the invention in which the welding process is continuous.

The object of this invention is to provide a machine for manufacturing a wire fence in which the strand-wires and stay-wires are electrically welded together; and it consists of the features of construction and arrangement of parts which are illustrated upon the drawings and which are now to be fully described, and finally set forth in the claims hereto appended.

Referring to the drawings, upon which a machine which I have selected for the purpose of illustrating my invention is shown, $a$ indicates the side standards, which I have connected by suitable cross-braces $a'$, $a^6$, and $a^7$, and upon one of the side standards the longitudinally-arranged main power-shaft $b$ is journaled in bearings supported by brackets $a^2 \, a^2$, as shown in Fig. 2. Power is applied to this shaft by a belt-wheel $b'$ or in any other desirable way, and from it motion is transmitted to the various movable parts of the machine.

The shaft $c$ is mounted in brackets $a^3 \, a^3$ and is provided with a bevel-wheel $c^2$, engaging and driving a bevel-wheel $c^3$, mounted upon a shaft $c^4$, arranged transversely of the machine and supported in brackets $a^4$. On its end the shaft $c^4$ is provided with a disk $c^5$, outward from which a wrist-pin $c^6$ projects and from which shaft motion is transmitted to feed the strand-wires intermittingly to the action of the welding devices. The said strand-wires, of which there may be as many as desired and which may be at any desired distance apart, are indicated by 2, and they are drawn from reels supported at any suitable point, the reels not being shown. They are first passed through tubular guides $d$, then between feed-wheels $e\,e$, and then through tubular guides $d'$, as more clearly illustrated in Fig. 4.

The feed-wheels are provided with intermeshing teeth, as shown in Fig. 5, the shaft $e'$ for one of the rolls being journaled in stationary bearings in a bracket $a^5$, supported by the frame, which bracket is utilized for supporting the tubular guides $d$, which are passed through a triangular cross-bar $a^6$. The shaft $e^2$ for the other movable wheel $e$ is supported in a movable bearing-yoke $e^3$, having its lower end pivoted to a cross-bar $e^4$, supported by brackets $e^5$, projecting outwardly from one of the lower cross-bars $e^7$. The upper end of each yoke $e^3$ is connected to a movable rod $e^6$, passing through a cross-bar $a^6$ and having on its end a washer $e^7$, between which and the cross-bar $a^6$ a strong spring $e^8$ is placed to draw upon the yoke $e$ and hold the feed-wheels yieldingly together. The feed-wheels may be separated by a cam-lever $e^9$, pivoted to the rod $e^6$ and adapted to engage a cross-bar $a^6$, so as to draw the rod against the tension of the spring $e^8$ and move the movable wheel $e$ away from the stationary wheel. It will be understood that there is a pair of wheels, a yoke $e^6$, and a cam-lever $e^9$ for each strand-wire.

The rotation of the feed-wheels $e$ $e$ is accomplished as follows: On the shaft $e'$ of the stationarily-mounted wheels $e$ is a small gear-wheel $f$, intermeshing with a large gear-wheel $f'$, mounted upon a stud-shaft projecting outwardly from a bracket $a^8$, supported by one of the side standards $a$. Secured to the wheel is a ratchet-wheel $f^2$, with which a dog $f^3$, mounted upon an oscillatory arm $f^4$, may engage to impart an intermittent rotary movement to the said wheel $f'$. The arm $f^4$ is pivoted upon the stud-shaft, which supports the gear-wheel $f'$, and is connected by a connecting-rod $f^5$ with the wrist-pin $c^6$, projecting outwardly from the disk $c^5$ on the shaft $c^4$, before referred to. By reason of the difference in diameter of the two gear-wheels $f'$ and $f$ and the difference in diameter between the gear-wheel $f$ and the feed-wheels $e$ the oscillation of the arm $f^4$ will be sufficient to feed the strand-wires forward a proper distance. The distance of feed may be varied by any desired means, such as illustrated in Figs. 18 to 22, this being a matter of mechanical detail. The strand-wires being fed downward a sufficient distance, the stay-wires are welded thereto by means which I shall describe, the strand-wires being suitably crimped at the same time, after which the finished product is passed around an idler-roll $g$, suitably journaled in the side standards $a$, and thence around a take-up roll $g'$, suitably journaled in the side standards. The said roll is driven by a belt $g^2$, passing around a belt-wheel $g^3$, mounted upon the projecting end of the said shaft $e'$, and around a belt-wheel $g^4$, secured to a shaft $g^5$, which imparts a movement to the said take-up roll $g'$.

By referring to Fig. 29 it will be seen that the take-up roll consists of a tubular shell $g^6$, of sheet metal, having its edges $g^7$ bent inward and normally closed by its resiliency. Into the ends of the shell are inserted the beveled bosses $g^8$ of disks $g^9$ $g^9$, which are provided with grooves $g^{10}$ to receive the said ends of the shell and which separate the edges $g^7$. One of the disks is rigidly secured to its shaft $g^5$, on which the belt-wheel $g^4$ is mounted, while the other disk is formed with a yoke $g^{11}$ to slide upon its stud-shaft $g^{12}$.

By any suitable means the movable disk $g^9$ may be forced toward and from the other disk to clamp or release the shell $g^6$ between them.

In employing the roll for taking up the finished product the ends of the strand-wires are passed into the slot or aperture between the edges of the shell and are bent down to engage one of the edges, so that when the said take-up roll is rotated the finished fence will be wound upon it. The roll is driven at a slightly-greater rate of speed than the feed-wheels, so as to preserve tension on the strand-wires, the belt $g^2$ being loose enough to slip upon one of the belt-wheels. Upon removing the shell from the supports it contracts in circumference or collapses, so as to allow the finished product to be easily taken or slipped off from it.

Now from the foregoing it will be seen that the strand-wires will be fed longitudinally a predetermined or desired distance, whereupon they will remain stationary for a length of time before being fed longitudinally again. During the time that they are stationary the stay-wires are welded thereto.

The feeding of the stay-wires is accomplished as follows: The feed-wheels $h$ $h'$ are arranged transversely near the front of the machine in position to feed a stay-wire 3 through tubular guides $i$ $i'$ to a rotating holder, to be described. The wheel $h$ is mounted in stationary bearings $a^9$, supported by one of the side standards $a$, while the shaft of the other wheel $h'$ is mounted in bearings in a yoke $h^2$, pivoted to the bracket $a^9$. To the outer end of the yoke is connected a rod $h^3$, passing through the end of a bracket $a^{10}$, projecting out from one of the side standards $a$ and having on its lower end a washer $h^4$, between which and the bracket $a^{10}$ a spring $h^5$ is placed to draw downward upon the rod and hold the feed-wheel yieldingly together. The cam-lever $h^6$ is pivoted to the rod $h^3$, so as to allow the feed-wheels to be separated. The wheel $h$ is rotated positively and intermittingly through the medium of the following devices: On the shaft $h^7$ of the wheel $h$ is placed a pinion $h^8$, intermeshing with and driven by a gear-wheel $h^9$, journaled upon a bracket $a^9$ and formed with a ratchet-wheel $h^{10}$, with which the dog $h^{11}$, mounted on an oscillating arm $h^{12}$, may engage, intermittingly rotating it. (See Fig. 3.) The said arm is oscillated by a connecting-rod $h^{13}$, pivoted to a wrist-pin $h^{14}$, projecting out from a disk $h^{15}$, secured upon the end of the shaft $c$. The gear-wheels are so related that the oscillation of the arm $h^{12}$ will cause the stay-wires to be fed forward a sufficient distance across the strand-wires 2. A holder for the stay-wires is employed to receive it as it moves forward through the tubular guide $i'$, said holder consisting of a series of grooved rolls $j$ $j$, mounted upon a shaft $j'$. The grooves flare at their ends so that the stay-wires will be easily guided into them, and for the purpose of holding the wires therein I employ a bracket $j^{14}$, to which are secured springs $j^{12}$, as shown in Figs. 14 and 15. After the stay-wire has been passed into the holder it is cut off by any suitable knife, such as that illustrated in Figs. 9, 10, 11, and 12. In these figures the knife $k$ is shown as secured to a shaft $k'$, which has an arm $k^2$, by means of which it is rocked at the proper movement to cause the knife to descend and cut off the ends of the wire. To the arm $k^2$ is pivoted a connecting-rod $k^3$, having its other end connected to an arm $k^4$, having its hub $k^5$ mounted loosely on the shaft $l$, which extends across the front of the machine and which is driven from the shaft $c^4$ by a chain $l'$, passing around a sprocket-wheel $c^{15}$ on the shaft $c^4$, and a sprocket-wheel $l^2$ on the end of the said shaft $l$. The cam $l^3$ is secured upon the shaft $l$ and is adapted to engage a roller $k^6$, journaled on the connecting-rod $k^3$, as shown in Fig. 10, so that when the cam is rotated its engagement with the roller $k^6$ rocks the arms $k^4$ and $k^2$ and depresses the knife so as to shear the mesh-wire.

The shafts $j'$ for the rolls $j$, which constitute the holder for the mesh-wire, are intermittingly rotated by means of the devices illustrated in Figs. 7 and 8. On the opposite end the shaft is provided with a ratchet-wheel $j^2$, with which a dog $j^3$, pivoted on a rocking arm $j^4$, may engage. The end of the arm $j^4$ is connected to an arm $j^5$, whose hub $j^6$ is mounted loosely on the shaft $l$ by a connecting-rod $j^7$, having a roller $j^8$ journaled in it, which roller bears against a cam $l^4$, secured to the shaft $l$. A spring $j^9$ connects an arm $j^{10}$, extending out from the hub $j^6$, with a stationary part of the machine, so as to hold the roller $j^8$ against the cam $l^4$. Now it will be seen that as the shaft $l$ rotates the rocking arm $j^4$ will be oscillated and the holder will be given a step-by-step movement.

Referring to Fig. 15, the holder is in the position indicated when a wire is fed into the groove 4, it being held therein by a bracket $j^{14}$, before referred to. Then when the ratchet-wheel $j^2$ is moved one step the stay-wire will be carried by the holder down into engagement with the strand-wires 2, where they are welded together, being held in place by the springs $j^{12}$.

I may employ a stop $m^{20}$, located in the path of the stay-wire, as shown in Figs. 7 and 28, to bring the wire to a stop when it has been moved in far enough to prevent it from projecting over the outside strand-wires.

Of course it will be understood that the strand-wires may be placed at different distances apart and the outside strand-wires may be heavier than the intermediate ones, if desired.

Any electrical welding apparatus may be employed for welding the stay-wires to the strand-wires; but for general purposes I prefer to employ that illustrated in Figs. 4, 13, 14, 15, 16, and 17.

A plate $a^{13}$ is placed across the front of the machine, as shown in Figs. 13 and 4, upon which the transformers are placed. By reason of the close proximity of the strand-wires the transformers are staggered—that is to say, each alternate transformer is elevated a short distance above the other, so that they may be placed within a small compass. The primary coils of insulated wire are indicated by $m$, while the iron cores are indicated by $m'$. Preferably the primary coils are arranged in multiple arc, although I have not shown the circuits. The copper secondary coil, which is of relatively large diameter in cross-section, is supported upon the plate $a^{13}$, though suitably insulated therefrom by any desirable insulating means, the said secondary wire coil being indicated at $m^2$. One end of each coil is connected to a bracket $n$, of suitable material, such as gun-metal, secured to the plate $a^{13}$ and electrically insulated therefrom. The tubular guide $d'$ for each strand-wire passes through the bracket $n$ and is suitably insulated therefrom. The bracket $n$ is formed with a slideway to receive a slide or plunger $n'$, in the inwardly-projecting end of which is secured the removable die or electrode $n^2$. A cap-plate $n^3$ bears yieldingly against the slide, being held thereagainst by springs $n^4$, so as to maintain a perfect electrical contact between the slides and the bracket. Threaded rods $n^5$ $n^5$ project rearward from the bracket $n$, and to them is secured a cross-head $n^6$, between which and the slide $n^2$ is placed a spiral spring $n^7$, which tends to hold the slide forward with a strong though yielding pressure against a stationary die $o$. The slide is normally held in its inoperative position by a lever $n^8$, pivoted on the bracket $n$ and having an insulated roller $n^9$, bearing against a cam $l^5$, mounted upon the shaft $l$. The cam is so formed that for a portion of the revolution of the shaft the slide will be withdrawn, and for the greater part of the remainder of its revolution the slide will be held forward with a continuous pressure, there being a depression 5 in the cam of a short length, which permits the spring to exert its greatest pressure in forcing the die against the intersecting stay and strand wire. The stationary die or electrode $o$ is connected to the other end of the secondary coil and is stationary or non-yielding, being in such position that the strand-wire will bear against it as it passes from the tubular guide $d'$. When a current is passing through the primary coils and the cam $l^5$ has allowed the movable die $n^2$ to engage the intersecting stay and strand wires and force them against the stationary die, the current passing between the two electrodes of the secondary coil will soften the wires sufficiently for the pressure of the spring to force them together, the welding being accomplished in a very small space of time.

The parts of the machine are so constructed and related that the dies firmly clamp the wires and are in close contact therewith before the circuit is closed through them. This is an important point in the operation of the machine, for if the electrode be in circuit before they clamp the wires as soon as they are about to contact with the wire an arc is apt to form and prevent a proper weld. The circuit is also broken before the movable die begins its rearward movement.

I arrange for breaking the circuit by any device applicable for this purpose. For instance, in Fig. 13 I have shown how I may employ an independent breaker for each primary-transformer circuit. The movable slide $n'$ may be provided with a yielding contact-spring $n^{10}$, which when the movable die has forced the wires together will engage the stationarily-adjustable contact-point $n^{11}$, mounted on a suitable bracket $n^{12}$.

It may be sufficient and desirable to use one circuit-breaker for all of the transformers, closing the circuit by means of a cam immediately after the electrodes have clamped the wires and breaking the circuit by spring-contact from a single plunger. It is assumed in this case that the welds are very nearly uniform. Or if found to be desirable I may employ a breaker for the main circuit, such as illustrated in Figs. 16 and 17, and operated by a cam $s$ on a suitable shaft $s'$. Inasmuch as this breaker is of the ordinary construction I shall not describe it in detail.

The operation of the machine is as follows: Power being applied to the belt-wheel, the strand-wires are fed forward a suitable distance by means of the toothed feed-wheels, and at the same time the stay-wire is fed transversely of the strand-wires by its feed-wheels into the holder. The knife $k$ is operated to sever the stay-wire, and the holder $j$ is rotated to carry the stay-wire down into engagement with the strand-wires, so as to hold the strand-wires firmly against the stationary dies, which are placed in alinement in the machine. By this time the strand-wires have been fed forward a suitable distance, and the cams $l^5$ are in position to allow the plungers or slides $n'$ to be forced inward gently and gradually against the intersecting strand and stay wires. The circuit is then closed until the cams $l^5$ reach a position to allow the springs $n^7$ to instantly force the movable dies inward with a greater pressure, after which the circuit is immediately opened, the plungers are moved back again into their inoperative positions, and the strand-wires are again moved forward for another mesh-wire to be welded in place. In addition to welding the mesh-wires to the strand-wires it is desirable, frequently, to crimp the strand-wires, and hence I employ the crimping devices illustrated in Fig. 4 and which are located below the welding-dies. A stationary die $p$ is suitably secured to the plate $a^{13}$, it being of any suitable shape, and with it coacts a movable die $p'$, convex in form to correspond with the concavity in the stationary die. The movable dies are all secured to the cross-head $p^2$, extending across the front of the machine and to the ends of which are pivoted arms $p^4$, having hubs $p^5$, journaled on eccentrics $p^6$. The eccentrics are rocked by arms $p^7$, connected by a rod $p^8$ to a pivoted arm $p^9$, having a roller extending into a cam-slot in the disk $c^5$. The parts are so timed that when the stay-wire is being welded to the strand-wires the die $p'$ is brought into engagement with the strand-wires and the die $p$, so as to crimp the said wires.

By referring to Figs. 27 and 28 it will be seen that the movable die $n^2$ of the welding apparatus has a groove 6 to receive the mesh-wire and a groove 8 for the strand-wire, while the stationary die $o$ is provided with a transverse groove 7 to receive the strand-wire 2 when the two wires are welded together. By this construction I am enabled to weld the two wires together more satisfactorily than I would if the dies were provided with flat faces.

It will be understood that I do not intend to limit myself in any way to the particular devices which I have illustrated and described in connection with this machine, as they may be varied in many ways and sometimes entirely dispensed with without departing from the spirit and scope of my invention. For instance, in Figs. 18 to 22, inclusive, I have shown a means for feeding the stay-wires entirely across the strand-wires or only partially across to form different styles of fence, as illustrated in Figs. 23 to 26, inclusive.

Figure 18:
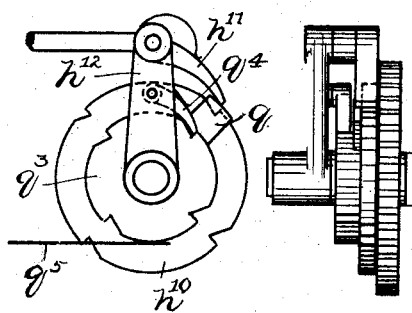
Figure 19:
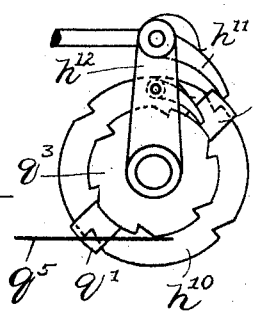
Figure 20:
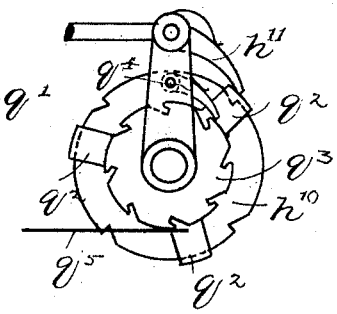
Figure 23:
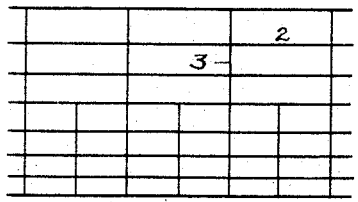
Figure 24:
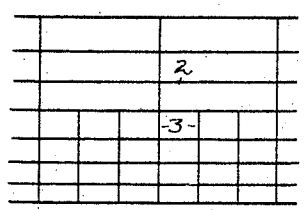
Figure 25:
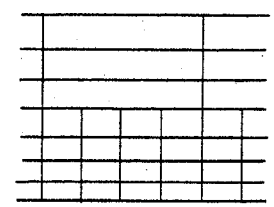

In Figs. 18, 19, and 20 the shields $q$ or $q'$ $q'$ or $q^2$ $q^2$ $q^2$ may be alternately moved over the serrations in the ratchet-disks $h^{10}$ by connecting them to a loosely-mounted ratchet-wheel $q^3$ and automatically operating said ratchet-wheel by an additional dog $q^4$, mounted on the arm $h^{12}$. The loosely-mounted ratchet-wheel $q^3$ is held against reverse rotation by flat springs $q^5$, which are strong enough for this purpose.

Figure 21:
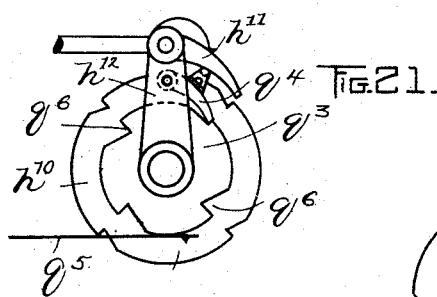

In Fig. 21 the secondary dog $q^4$ is arranged to lift the dog $h^{11}$ at any point in its movement, the time when the pawl will be disengaged from the ratchet-wheel $h^{10}$ depending upon the depths of the notches $q^6$ in the ratchet-wheel $q^3$.

Figure 22:
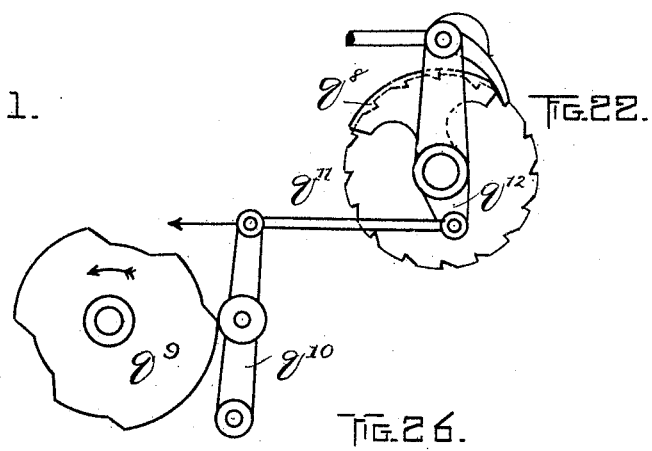
Figure 26:
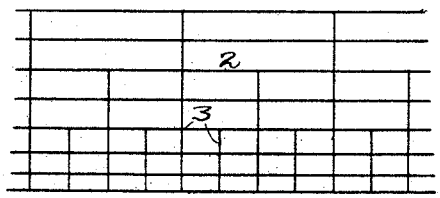

In Fig. 22 the shield $q^8$ is operated by a cam $q^9$, a lever $q^{10}$, a connecting-rod $q^{11}$, and an arm $q^{12}$, to which the shield is connected.

Devices of this nature may be employed for regulating the feed of the strand-wires also, if it is so desired, or, if desired, the strand-wires may be drawn through tubular guides by the crimping devices, such as illustrated in Fig. 30, in which case the crimping-dies are mounted upon a slide $r$, which when the dies are engaged with the strand-wires are drawn forward by a crank-arm $r'$ and a connecting-rod $r^2$.

The take-up roll or drum may be so arranged as to be capable of being rotated forward independently of its driving-wheel $g^3$ and independently of the shaft $e'$ by inserting between the belt-wheel and the said shaft a pawl and a ratchel-wheel such as indicated in dotted lines in Fig. 1.

In Figs. 31 and 32 I have shown means for welding the stay-wires to the strand-wires without the necessity of bringing the strand-wires to a state of rest intermittingly. In this event I employ the rotating drum $s^2$, having thereon a series of welding devices, there being a corresponding number of holders for the stay-wires, which are drawn therein by rolls $t$, mounted upon the drum. The drum is rotated by the gear-wheels $s^3$ $s^4$, there being a segmental rack $s^5$, with which pinions $s^6$, which operate the feed-wheels for the stay-wires, may engage and be driven during a portion of the revolution of the drum. A segmental cam-guide $u$ is employed, with which the levers $v$, which draw back the movable dies, may engage, so that when the stay-wires are being fed into place the movable dies will be withdrawn, and during the remainder of the revolution of the drum said movable dies may be depressed to accomplish the welding. The guides $v'$ for the movable dies are provided with spiral slots, into which project pins from the plungers on which the dies are mounted, so that when the levers $v$ engage the end $u'$ of the segmental guide $u$ the plungers will be partially rotated, so as to disengage the bent ends thereof and the dies from the strand-wires, and the cutters are operated by a stationary cam. The primary coils of the transformers may be connected in any suitable way with the main circuit, as I do not limit myself to any particular means for accomplishing this purpose, and any of the well-known methods of cooling the holders for the electrodes may be followed, if it be found necessary or desirable.

Though I have shown the machine as adapted more particularly for manufacturing fences having the stay or mesh wires arranged perpendicularly to the strand-wires, yet the feeding devices may be arranged to place the wires at any angle to each other, and by passing a single strand-wire through the machine and welding a short piece of the stay-wire thereto a barbed wire is produced suitable for fencing. Hence when I refer to the cross or mesh wires as "stay-wires" I mean to be understood as including a short length or spur of metal as well as a wire arranged to intersect or cross or be placed in contact with or secured to the strand wire or wires.

I do not herein claim the machine shown in Figs. 31 and 32, as it forms the subject-matter of a copending application, Serial No. 702,902, filed January 21, 1899.

Having thus explained the nature of the invention and described a way of constructing and using the same, though without attempting to set forth all of the forms in which it may be made or all of the modes of its use, I declare that what I claim, and desire to secure by Letters Patent, is—

1. A machine for making wire fence, comprising means for feeding a strand-wire, means for feeding a stay-wire, and means for welding said wires at their points of contact or intersection.

2. A machine for making wire fence, comprising means for feeding the strand-wires, means for feeding the stay-wires transversely thereof, and means for electrically welding said wires at their points of contact.

3. A machine for making wire fence, comprising a series of guides for the strand-wires, means for feeding said strand-wires through said guides, guides for the stay-wires, means for feeding said stay-wires transversely of said strand-wires, and means for electrically welding said strand-wires and said stay-wires at their points of contact.

4. A machine for making wire fence, comprising means for feeding the strand-wires, means for feeding the stay-wires, and means for electrically welding said strand and stay wires at their points of contact, said means including a stationary die, a movable die, and means for moving said movable die yieldingly against the stationary die.

5. A machine for making wire fence, comprising guides for the strand-wires, means for feeding said strand-wires through said guides, guides for the stay-wires, variable means for feeding the stay-wires for different distances across said strand-wires, and means for electrically welding said stay-wires and said strand-wires at their points of contact.

6. A machine for making wire fence comprising means for feeding the stay-wires, guides for the strand-wires, means for feeding the strand-wires for any desired distance relatively to the stay-wires, and means for electrically welding said stay-wires and said strand-wires at their point of contact or intersection.

7. A machine for making wire fence comprising means for feeding a strand-wire, means for feeding a stay or cross wire, a holder for the stay-wire, and means for electrically welding said stay and said strand wires at their point of contact.

8. A machine for making wire fence comprising means for feeding a strand-wire, means for feeding a stay-wire, a cutter for said stay-wire, and means for electrically welding said strand and said stay wires at their point of contact.

9. A machine for making wire fence comprising means for feeding the strand-wires, means for feeding the stay-wire, and means for electrically welding said strand and said stay wires, said means including a circuit-breaker adapted to be operated intermittingly to break the circuit.

10. A machine for making fence comprising means for feeding a strand wire or wires, a holder for a cross or stay wire, and means for electrically welding said wires together.

11. A machine for making fence-wire comprising means for feeding forward a wire, a holder for a cross-wire, and means for electrically welding said wires together.

12. A wire-welding machine, comprising means for supporting a plurality of intersecting wires, and means for automatically welding said wires at their intersections, said means including a plurality of transformers, and electrodes, and one or more circuit-breakers.

13. A wire-welding machine, comprising means for supporting a plurality of intersecting wires, a plurality of electrodes for contacting with said wires at their intersections, a plurality of transformers for said electrodes, automatically-acting circuit-breakers, and power devices for actuating said electrodes.

14. A wire-welding machine, comprising electrodes for supporting two intersecting wires, mechanism for actuating the electrodes to clamp the wires at their intersections between them, a transformer for the electrodes, and an automatically-operated circuit-breaker for cutting off the current through the transformer.

15. A machine of the character described comprising automatically-operated welding devices, and a holder operable automatically to place a cross-wire in position on a strand-wire.

16. A wire holding and positioning device for wire-fence-making machines comprising a rotatory shaft, a series of longitudinally-grooved rolls on the shaft, and a guide for retaining the wire in the grooves.

17. A wire-positioning device for electric fence-making machines, comprising a rotary grooved member and a guide for retaining the wire in the groove, said guide being constructed to allow said wire to pass out of the groove at the completion of the weld.

18. A wire holding and positioning device, consisting of a grooved movable member, and a stop in the line of the grooves for the wire to abut against.

19. A wire-fence machine comprising a series of coacting welding-electrodes, a shaft having cams for operating the movable members of said electrodes, an automatic cross-wire holder, and an automatic cutter for said cross-wire.

20. A wire-fence machine comprising a plunger, a stationary electrode, a removable electrode in the end of the plunger, said electrodes being formed to grasp and hold crossed wires, and means for automatically operating the plunger.

21. An electric welding-machine comprising coacting electrodes, mechanism for operating said electrodes to grasp crossed wires and to upset them at the time of welding, means for effecting a regular forward movement of the longitudinal wires and an automatic circuit-breaker to regulate the welding-current.

In testimony whereof I have signed my name to this specification, in the presence of two subscribing witnesses, this 29th day of April, A. D. 1897.

JOHN C. PERRY.

Witnesses:
A. D. HARRISON,
P. W. PEZZETTI.